United States Patent [19]

Hanrahan et al.

[11] Patent Number: 4,974,147
[45] Date of Patent: Nov. 27, 1990

[54] PROGRAMMABLE QUIESCE APPARATUS FOR RETRY, RECOVERY AND DEBUG

[75] Inventors: Donald J. Hanrahan, Endwell; Bruce J. Morehead, Endicott; David J. Shippy, Endwell, all of N.Y.

[73] Assignee: International Business Machines Corporation, Armonk, N.Y.

[21] Appl. No.: 288,639

[22] Filed: Dec. 21, 1988

[51] Int. Cl.[5] ............................................. G06F 11/00
[52] U.S. Cl. ............................ 364/200; 364/242.6; 364/267.91; 364/267.3; 364/265.6; 364/262
[58] Field of Search ... 364/200 MS File, 900 MS File

[56] References Cited

U.S. PATENT DOCUMENTS

| | | | |
|---|---|---|---|
| 4,488,217 | 12/1984 | Binder et al. | 364/200 |
| 4,495,571 | 1/1985 | Staplin, Jr. et al. | 364/200 |
| 4,620,278 | 10/1986 | Ellsworth et al. | 364/200 |
| 4,706,190 | 11/1987 | Bomba et al. | 364/200 |
| 4,719,569 | 1/1988 | Ludemann et al. | 364/200 |

*Primary Examiner*—Thomas M. Heckler
*Attorney, Agent, or Firm*—Baker, Maxham, Jester & Meador

[57] ABSTRACT

An apparatus for suspending processor operation in response to an error indication wherein the processor is cycled to a known state prior to the stopping of the system clock to enable the system to be interrogated in order to determine the cause of the error indication.

5 Claims, 8 Drawing Sheets

PROGRAMMABLE QUIESCE APPARATUS FOR RETRY, RECOVERY AND DEBUG

This application is related to co-pending U.S. Pat. Application Ser. No. 97/211,584, entitled "SIMULTANEOUS TRANS-PROCESSOR BROADCAST OF MACHINE CONDITIONS IN A LOOSELY-COUPLED MULTI-PROCESSOR SYSTEM"; U.S. Pat. Application Ser. No. 97/211,469, entitled "APPARATUS FOR PARTITIONED CLOCK STOPPING IN RESPONSE TO CLASSIFIED PROCESSOR ERRORS"; U.S. Pat. Application Ser. No. 07/288,797, entitled "LEAST RECENTLY USED ARBITER WITH PROGRAMMABLE HIGH PRIORITY MODE AND PERFORMANCE MONITOR"; and U.S. Pat. Application Ser. No. 07/291,543, entitled "MESSAGE BUFFER APPARATUS" for an INPUT/OUTPUT control processor, all assigned to the Assignee of this application.

BACKGROUND OF THE INVENTION

This invention relates to an apparatus and method for suspending I/O control processing in response to system errors. More specifically, the present invention relates to a processing system in which an I/O control processing unit having an instruction processing unit for processing system I/O instructions and a bus arbiter for controlling priority in information transfer on a shared bus, in which an apparatus is provided for, in response to a system error indication, suspending instruction processing unit operation in a known state and bus arbiter operation Digital computer systems implement modules which perform specific functional operations. These functional modules utilize clock signals for operation timing. Specifically, the system includes error indicators for detecting module operation errors. Once an error is detected it is desirable to evaluate and correct the error. In many cases the system clocks must be stopped instantly to capture the state of the machine for error checking. However, instantaneous halting of the clocks may cause data integrity problems and, in most instances, the machine would have to be put through an initial machine load (IML) state. The placing of the system in the IML state is a process of setting all latches in the processor to a known state. However, typically placing the system in the IML state is a time-consuming process that is a major interruption of normal system program execution.

With particular reference to I/O interfaces for retry and recovery following a machine check or error condition, typically the system clocks are also instantaneously stopped. In addition, arbitration of new bus requests by I/O devices on an address/data/communications (ADC) bus, typically shared by all I/O devices, to the I/O interface are inhibited. However, as previously mentioned, instantaneous stopping of the clocks may cause data integrity problems due to the incomplete state of operations between modules.

In software debugging application, it is desirable to halt system activity in order to interrogate the system. Again, instantaneous stopping of the system clocks to capture the state of the system may result in data integrity problems. In all conditions of retry, recovery and debug following stoppage of the system, there is a high probability that the system state is unknown which may seriously affect system operation if the clocks are immediately restarted. In order to insure proper operation of the system upon restart, all latches must be reset to a known state, such as through the initial machine load process.

An improved system may avoid the requirement of placing the system, upon detection of an error condition, in the IML state by placing the system into a known state prior to the stopping of the system clocks. Placing of the system into a known state prior to clock stopping would greatly facilitate restarting of the clocks and the processor upon correction of error condition.

SUMMARY OF THE INVENTION

The present invention is directed to an apparatus embodied in a processing system that is responsive to an error indication for suspending processor operation in a known state. The processor, upon receiving an error indication, completes the current operation and is cycled to a known state prior to the stopping of system clocks. The apparatus is particularly embodied in a processing system having an I/O control processing unit for processing system I/O instructions. The apparatus is utilized to place the I/O processor in a known state for retry, recover, and debug operations. The apparatus further suspends ADC bus arbitration to prevent granting of the ADC bus to a bus requesting element or device while the processor is cycling to the known state for stoppage of the system clocks.

It is, therefore, an advantage of the invention that the processor in response to an error condition, is cycled to a known state prior to stopping of the clocks thereby eliminating initiation of the IML process prior to restarting of the clocks.

It is yet another advantage of the present invention to suspend ADC bus arbitration when an error condition is detected, so as to prevent granting of the ADC bus to a requesting bus user during the cycling of the processor to the known state.

Further scope of applicability of this invention will be evident when the detailed description given below is read with reference to the below-described drawings. It will, however, be manifest that the detailed description and specific examples given below, while indicating a preferred embodiment of the invention, serve only to illustrate it, since various elaborations, changes and modifications within the spirit and scope of the invention will be evident to the skilled artisan.

DETAILED DESCRIPTION OF THE INVENTION

Figure 1:
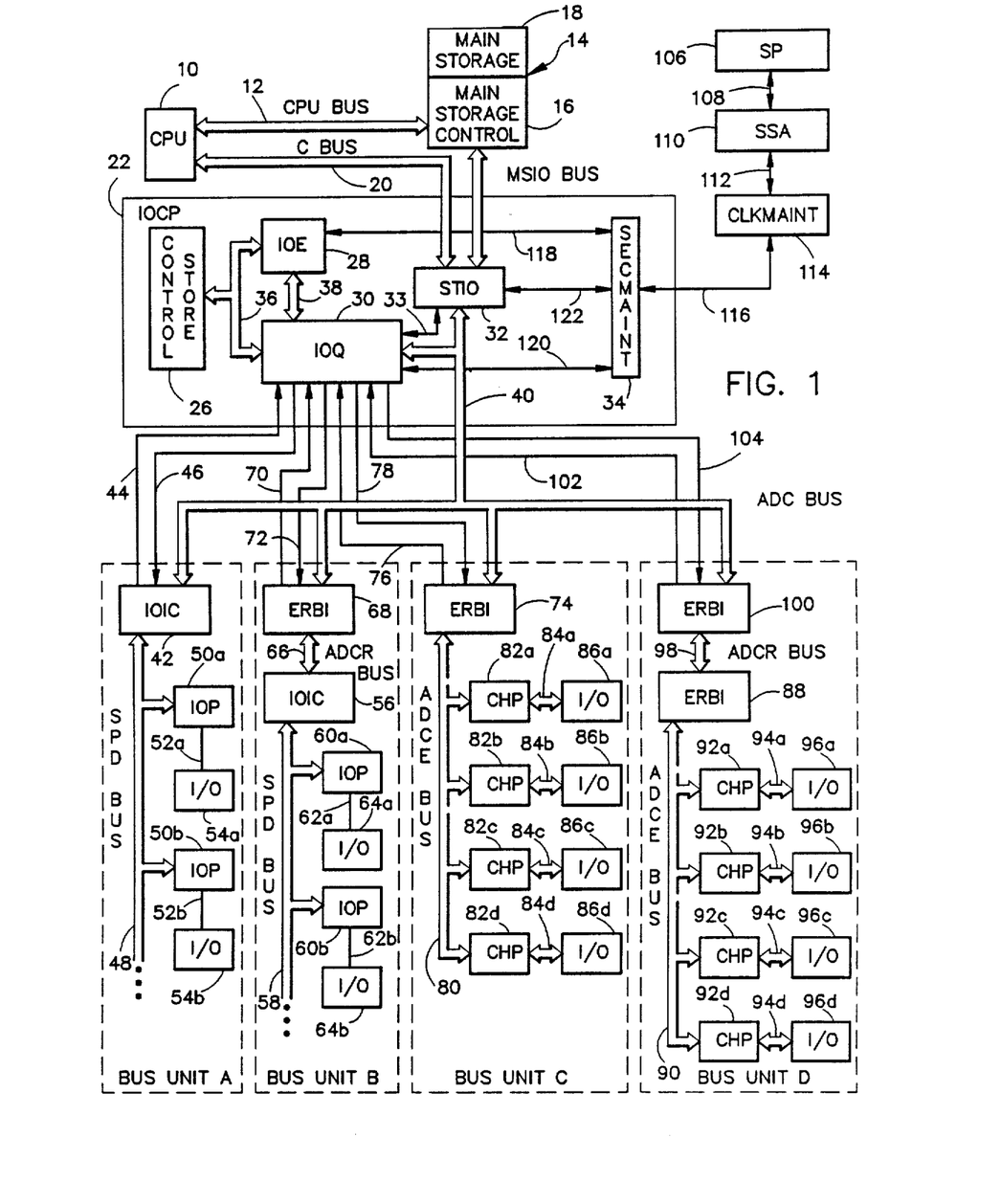
FIG. 1 is a block diagram of a computer system which incorporates the present invention.

FIG. 1 illustrates block diagram elements which form a computer system. The system includes a central processing unit (CPU) 10 which is coupled by bi-directional central processing unit (CPU) bus 12 to main storage 14. Central storage device 14 includes a main storage control portion and a main storage portion 18. CPU bus 12 is coupled to main storage 14 at main storage control portion 16 which controls information transfer between external devices and main storage portion 18. Main storage portion 18 provides software level instruction and data storage. CPU 10 processes software level instructions that are stored in central storage 14.

CPU 10 is also coupled by a bi-directional communications (C) bus 20 to an I/O control processor (IOCP) card 22. IOCP 22 is coupled by a bi-directional main storage I/O (MSIO) bus 24 to central storage 14. IOCP 22 processes all software level I/O instructions stored in main storage 14 in addition to controlling the flow of information between I/O devices and main storage 14. IOCP 22 is coupled by C bus 20 so as to permit either processor, CPU 10 or IOCP 22, to transfer interrupt or control information to one another.

IOCP 22 is comprised of control storage element 26, an I/O engine (IOE) element 28, an I/O queue or (IOQ) element 30, a storage and I/O interface (STIO) 32 and a secondary clock maintenance (SECMAINT) apparatus 34. CPU 10 and IOCP 22 are independently clocked from one another, resulting in the respective processing operations to occur at different speeds.

IOE element 28 and IOQ element 30 are the processor elements of IOCP 22. IOE element 28 and IOQ element 30 are coupled to control store 26 by control store (CS) bus 36 in order to access microcode program instructions stored in control store 26. IOE element 28 and IOQ element 30 execute microcode instructions with the program including various routines necessary to perform the various I/O functions and operations required of IOCP 22 in processing I/O. Both IOE element 28 and IOQ element 30 receive a 4-byte microword, in parallel, from control store 26 on CS bus 36. However, one or both of IOE element 28 and IOQ element 30 execute the microword depending upon the specific microword. Typically, IOE element 28 executes arithmetic and logic microwords, while IOQ element 30 executes microwords which interface with units that interconnect with the IOCP 22. IOQ element 30, for example, executes microword relative to operations which relate to CPU 10, main storage 14 or various I/O devices. Both IOE element 28 and IOQ element 30 execute the type of microword which instructs an operation for moving data between IOE element 28 and IOQ element 30 via a bi-directional external (E) bus 38 coupled between IOE element 28 and IOQ element 30.

IOQ 30 is also coupled by an address/data/communication (ADC) bus 40 to STIO element 32. STIO element 32 functions as an interface for passing data and instructions between CPU 10 and IOQ element 30, and between main storage 14 and IOQ element 30. STIO element 32 includes buffers and various other logical elements for message storage and transfer control. STIO element 32 is coupled by line 33 to IOQ element 30 to provide bus activity status data to IOQ element 30.

IOCP 22 further includes SECMAINT apparatus 34 which is coupled to IOE element 28, IOQ element 30 and STIO element 32 to provide, among other functions, suspension of clock signals to certain elements of IOCP card 22 should an error be detected in IOCP card 22. Although the SECMAINT apparatus 34 does form a part of the present invention, further description of the clock suspension feature is found in co-pending U.S. Pat. Application Ser. No. 07/211,469, entitled "APPARATUS FOR PARTITIONED CLOCK STOPPING IN RESPONSE TO CLASSIFIED PROCESSOR ERRORS" referenced above. SECMAINT apparatus 34 further provides a communication path between the IOCP card 22 and monitoring and error correction hardware discussed later.

IOCP card 22 is coupled by ADC bus 40, and a series of bus request lines and corresponding bus grant lines, to individual bus units. For purposes of explanation, four such I/O device bus units are illustrated and referenced herein as Bus Units A-D. It should be understood that the present invention may comprise fewer or greater bus units. It should further be understood that both the IOQ element 30 and STIO element 32 are also considered as bus units for purposes of accessing and using the ADC bus 40.

ADC bus 40 consists of a 4-byte bi-directional data bus and a 4-bit bi-directional control bus. Each non-IOCP card element bus unit has a unique request line and grant line which are connected to IOQ element 30. Each bus unit which desires access the ADC bus activates a request signal which is provided to IOQ element 30. IOQ element 30 responds to the request signal by arbitrating between all requesting bus units and providing a grant signal to a requesting bus unit based upon a priority scheme implementing the least recently used (LRU) algorithm.

In FIG. 1, Bus Unit A comprises an I/O interface controller (IOIC) card 42 which is coupled to ADC bus 40. IOIC card 42 is also coupled by request line 44 and grant line 46 to IOQ element 30. IOIC card 42 is also coupled by a bi-directional data and control (SPD) bus 48 which couples IOIC card 42 to a series of I/O processor (IOP) cards such as IOP cards 50a and 50b. Each IOP card is coupled by line 52 to respective device 54. For example, IOP card 50a is coupled by line 52a to IO device 54a.

Each IOP card 50 is an intelligent microprocessor based subsystem providing control of the attached I/O device 54. Each specific type of IOP card is dedicated to a specific category of I/O devices such as a tape or direct access storage device (DASD), workstation or telecommunications device.

Each I/O device 54 interfaces with IOCP 22 via IOP card 50 and IOIC card 42. IOIC card 42 functions as an interface between the IOP cards 50 and the IOCP card 22. When one of the I/O devices 54 in Bus Unit A seeks access of ADC bus 40, IOIC card 42 generates a request signal which is provided on request line 44 to IOQ element 30. Should the IOQ element 30 grant the I/O device bus request, IOQ element 30 transmits a bus grant signal on grant line 46 to IOIC card 42. IOIC card 42 communicates with the appropriate IOP 50 and associated I/O device 54 for permitting I/O device 54 access to the ADC bus 40.

Bus Unit B is similar to that of Bus Unit A in that IOIC card 56 is coupled by SPD bus 58 to a series of IOP cards, IOP cards 60a, 60b, etc. IOP cards 60a and 60b, as illustrated, are respectively coupled by lines 62a and 62b to a respective I/O device 64a and 64b. IOIC card 56 is positioned in a remote location from that of IOIC card 42. IOIC card 56, due to its remote location positioning, is coupled by an address/data/ communication remote (ADCR) bus 66 to an extended remote bus interface (ERBI) card 68. ERBI card 68 is coupled to ADC BUS 40 and to IOQ element 30 by request line 70 and grant line 72. ERBI card 68, in essence, functions as a bus extension of ADC bus 40 to accommodate for the remote location of IOIC card 56.

Bus Unit C is comprised of ERBI card 74 which is coupled to ADC bus 40 in addition to being coupled by request line 76 and grant line 78 to IOQ element 30. ERBI card 74 is also coupled by bi-directional address-/data/communication extension (ADCE) bus 80 to a series of channel processor (CHP) cards 82a-82d. Channel processors 82a-82d are each coupled by respective bi-directional channel bus 84a-d to a corresponding I/O device 86a-86d. CHP cards 82a-82d are intelligent microprocessor based subsystems, similar to the IOP cards, which provide control of the attached I/O device 86a-86d. In Bus Unit C, an I/O device requesting access to ADC bus 40 communicates such request via a corresponding CHP card 82 and ERBI card 74 to IOQ element 30. ERBI card 74 generates the request signal which is provided on line 76 to IOQ element 30. In response thereto, and according to the arbitration scheme, a grant signal is provided by IOQ element 30 on line 78 to ERBI card 74. ERBI card 74 provides a signal to the corresponding CHP card to enable access to the requesting I/O device 86.

Bus Unit D is similar to that of Bus Unit C in that ERBI card 88 is coupled by an ADCE bus 90 to a series of CHP cards 92a-92d. Correspondingly, each CHP card 92A-92D is coupled by a respective channel bus 94a-94d to a respective IO device 96a-96d. ERBI card 88 is coupled by an ADCR bus 98 to ERBI card 100. ERBI card 100 is coupled to ADC bus 40 in addition to being coupled to IOQ element 30 by request line 102 and grant line 104.

The system illustrated in FIG. 1 further comprises a support processor (SP) apparatus 106 which is coupled by line 108 to support system adapter (SSA) 110. SSA 110 is coupled by line 112 to a primary clock maintenance (CLKMAINT) card 114 which is coupled by line 116 to SECMAINT apparatus 34 located on IOCP card 22. SECMAINT apparatus 34 is respectively coupled by lines 118, 120 and 122 to IOE element 28, IOQ element 30 and STIO element 32.

SP 106 may include an operator console which allows monitoring of system activity and performance of system maintenance. SP 106 may also provide system clock starting/stopping, machine state scanning and changing of 25 individual latch values in the system as required. SP 106 is coupled through SSA 110 which is a local area network (LAN) interface. CLKMAINT card 114, in addition to the SECMAINT module 34, provide clock maintenance and control along with providing a communication path between SP 106 and IOCP card 22.

Bus Units A-D are but one exemplary embodiment of a series of bus units coupled to the IOCP 22. It is to be understood that many variations in bus units may be realized.

Figure 2:
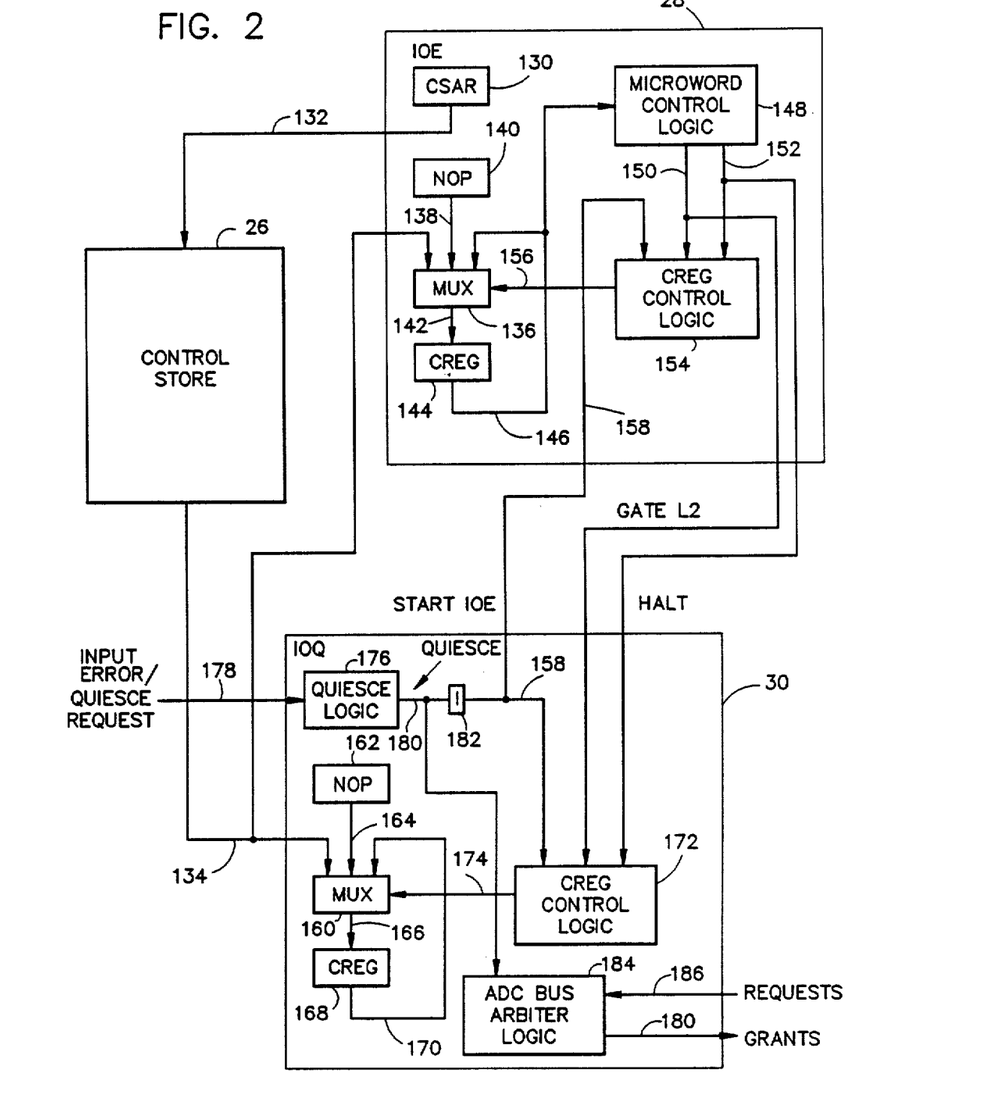
FIG. 2 illustrates in block diagram form the programmable quiesce apparatus for retry, recovery and debug of the present invention.

FIG. 2 illustrates in block diagram form a portion of IOCP 22, and in particular IOE element 28, control store 26 and IOQ element 30. For purposes of illustration, only elements relevant to the particular aspect of this invention are illustrated in IOE element 28 and in IOQ element 30. IOE element 28 includes a control store address register (CSAR) 130 which provides the control store address for the current microword on line 132 to control store 26. Control store 26 provides the current microword on line 134 to both IOE element 28 and IOQ element 30.

IOE element 28 includes three to one multiplexer 136 which has an input coupled by line 134 to control store 26. Multiplexer 136 also has an input coupled by line 138 to no operation (NOP) element 140. NOP element 140 is typically a hard wired no operation microword. The output of multiplexer 136 is coupled by line 142 to an input of control register (CREG) 144. The output of CREG 144 is coupled by line 146 to another input of multiplexer 136 and to microword control logic 148.

Microword control logic 148 decodes the current microword for generating control signals relating to the sequencing of the microword through the CREG 144. Accordingly, microword control logic 148 generates the control signals, GATEL2 and HALT (CREG), respectively on lines 150 and 152 to control register (CREG) control logic 154. CREG control logic 154 provides a series of output signals on line 156 to multiplexer 136, so as to control the microword which is loaded in CREG 144. The value loaded into CREG 144 via muliplexer 136, in response to the control signal on line 156, is either the control store microword, a hard wired no operation code, or the present microword. CREG control logic 154 also receives from IOQ element 30 a START IOE signal on line 158 which forces via CREG control logic 154, multiplexer 136 and NOP element 140; the no operation microword into CREG 144.

Although not illustrated, the output of CREG 144 is used by IOE 28, for decoding and performing the respective logic operations in accordance with the microword in CREG 144 with respect to IOE element 28 functions.

IOQ element 30 includes circuitry similar in nature to IOE element 28. In IOQ element 30, the current microword from control store 26 is provided on line 134 to an input of three to one multiplexer 160. A no operation (NOP) element 162 provides the hard-wired no operation microword on line 164 to multiplexer 160. The output of multiplexer 160 is provided on line 166 to an input of control register (CREG) 168. The output of CREG 168 is provided on line 170 to the final input of multiplexer 160.

IOQ element 30 includes CREG control logic 172 which also receives the GATEL2 and HALT signals respectively on lines 150 and 152, along with the START IOE signal on line 158. CREG logic 172 provides an output signal on line 174 to multiplexer 160 for controlling the microword selected for CREG 168. It should be understood that NOP elements 140 and 162, multiplexers 136 and 160, CREGS 144 and 168, and CREG control logic 154 and 172 are structurally and functionally identical.

IOQ element 30 also includes quiesce logic 176 which generates a QUIESCE signal in response to an input error indication or quiesce request on line 178. Quiesce logic 176 in response to an error condition or a quiesce request generates a QUIESCE signal on line 180 to an input of inverter 182 and ADC bus arbiter logic 184. The output of inverter 182, the inverted QUIESCE signal, is provided on line 158 as the START IOE signal. The QUIESCE signal is provided to ADC bus arbiter logic 184 to suspend further grants for the ADC bus. The QUIESCE signal, as inverted by inverter 182 and provided as the START IOE signal, is utilized to force a no operation microword into CREG's 144 and 168. Although not illustrated, the output of CREG 168 is used by IOQ 30 for decoding and performing the respective logic operations in accordance with the microword in CREG 168 with respect to IOQ element 30 functions.

Figure 3:
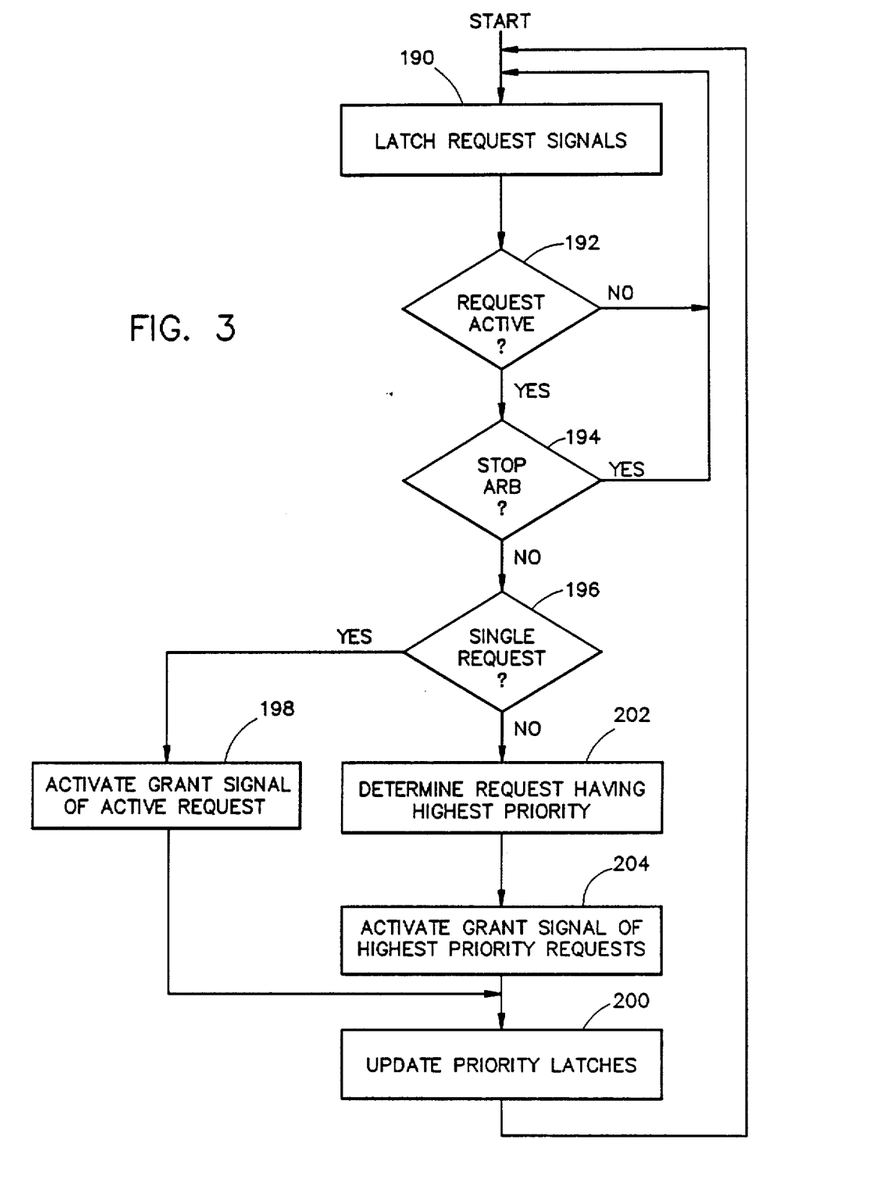
FIG. 3 is a flow chart showing the various steps of operation of the system ADC bus arbiter.

The particular bus arbiter utilized is disclosed in detail in co-pending U.S. Pat. Application Ser. No. 97/288,797, entitled Least Recently Used Arbiter with Programmable High Priority Mode and Performance Monitor. FIG. 3 is a flow diagram illustrating the steps of bus request arbitration in the bus arbiter of the present invention which utilizes a least recently used (LRU) algorithm. It should be noted that the description of the operational steps of FIG. 3 include reference to the elements of FIG. 2 for purposes of clarity with respect to the operation description. Each IOCP clock cycle the bus unit request signals are latched (block 170) in a series of bus request latches. If there are no bus requests, no further activity is performed by the bus arbiter in the present cycle latched request status (block 192).

If one or more bus units are requesting access to the bus, the active request signals are latched (block 190) and detected (block 192). If during the current cycle, request activity is detected and the bus arbiter is inactive (block 194), arbitration activity is not performed with respect to the current cycle request status. The stop arbitration decision (block 194) consists of detecting either a bus busy indication or a quiesce condition. During the next clock cycle, the bus unit request signals are again latched (block 190), with the request active determination made (block 192) and with an active request status existing, the stop arbitration determination (block 194) is made. If during this cycle the bus arbiter is active, the arbitration process continues at this point, the bus arbiter determines whether or not there is a single or multiple bus units requesting access to the bus (block 196).

If a single bus unit is requesting access to the bus, a grant signal corresponding to the requesting bus is activated (block 198). Upon granting the single requesting bus unit access to the bus, priority latches are updated (block 200) by next state priority logic. Upon updating of the priority latches, the priority logic is ready for making a determination of further granting of bus requests by latching the bus unit requests (block 190). Should multiple bus units request access to the bus (block 196), a determination is made of the bus unit requester having the highest priority (block 202). A grant signal corresponding to the requesting bus unit having the highest priority is then granted (block 204). Upon generating the bus grant signal, the priority latches are updated (block 200) by the priority next state logic. Upon updating of the priority latches, the priority logic is again ready to process the subsequent cycle bus request status.

Figure 4:
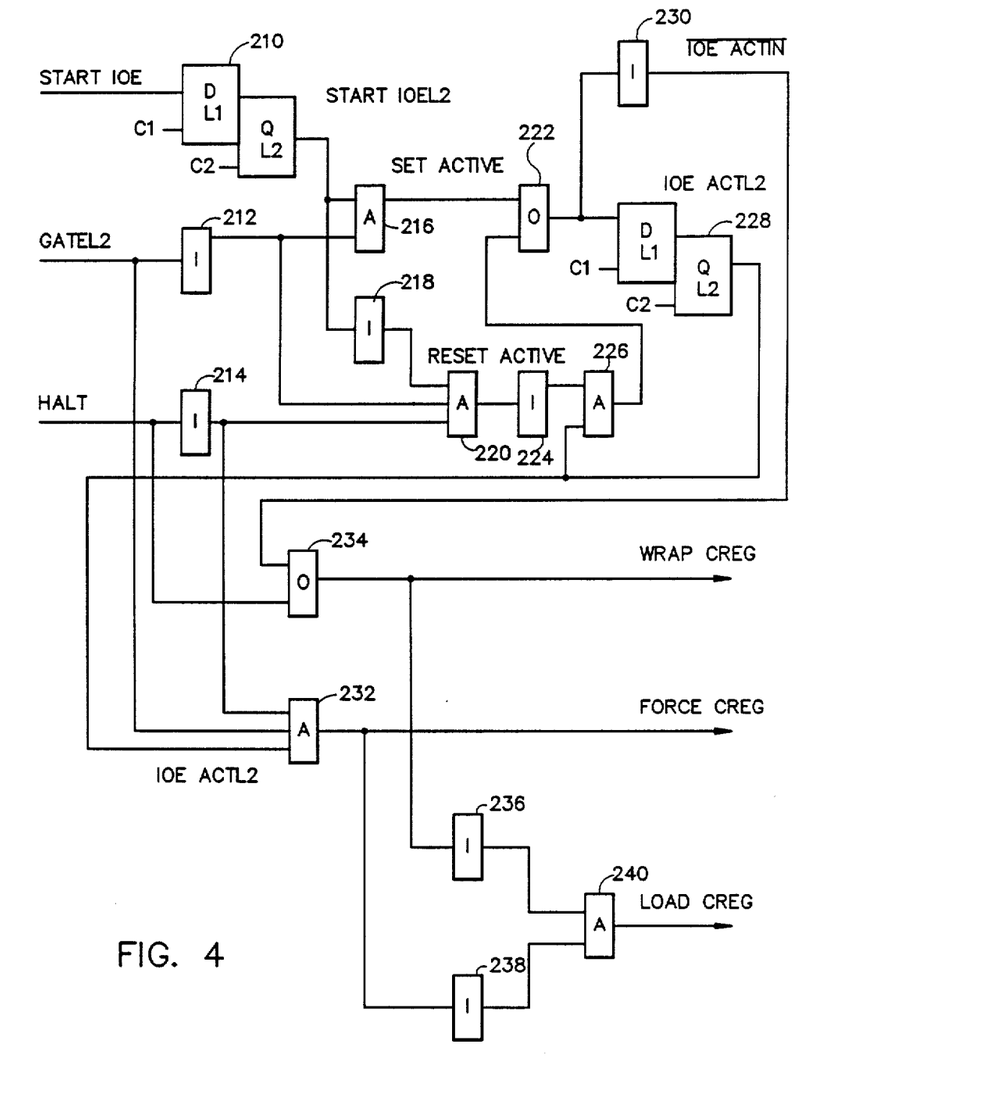
FIG. 4 illustrates, in schematical form, a specific circuit implementation of the control register control logic.

FIG. 4 illustrates in schematical form CREG control logic 154. Preferably, the specific circuitry hereinafter described is based upon level sensitive scan design (LSSD) circuitry. In this regard, the basic circuit unit is a shift register latch (SRL) containing two latching elements, referred to as $L_1$ and $L_2$, respectively. One such SRL is indicated by the reference numeral 210 in FIG. 4. Ports D and C of the $L_1$ element are respectively used for data and clock inputs to the SRL. The $L_2$ element has a data input internally connected to the $L_1$ element output and uses the B input for clocking of data into the $L_2$ element. In a latch-trigger design, the B input is also used for the trigger clock, which provides the main timing sequence in this invention. Each SRL is fed a clock signal consisting of two clock waveforms $C_1$ and $C_2$, such as those illustrated in the timing diagram of FIG. 5. Data presented to the D input of the $L_1$ element enters the $L_1$ element while the $C_1$ clock waveform has a positive level. The data is latched or retained in the $L_1$ element at the rising edge of the $C_2$ waveform. The data in the $L_2$ element is thus available as the SRL output until the next rising edge of the $C_2$ clock waveform. The fundamental operation cycle ("the machine cycle") of the processor in which the invention operates is defined by the period between successive rising edges of the $C_2$ clock waveform.

Figure 8:
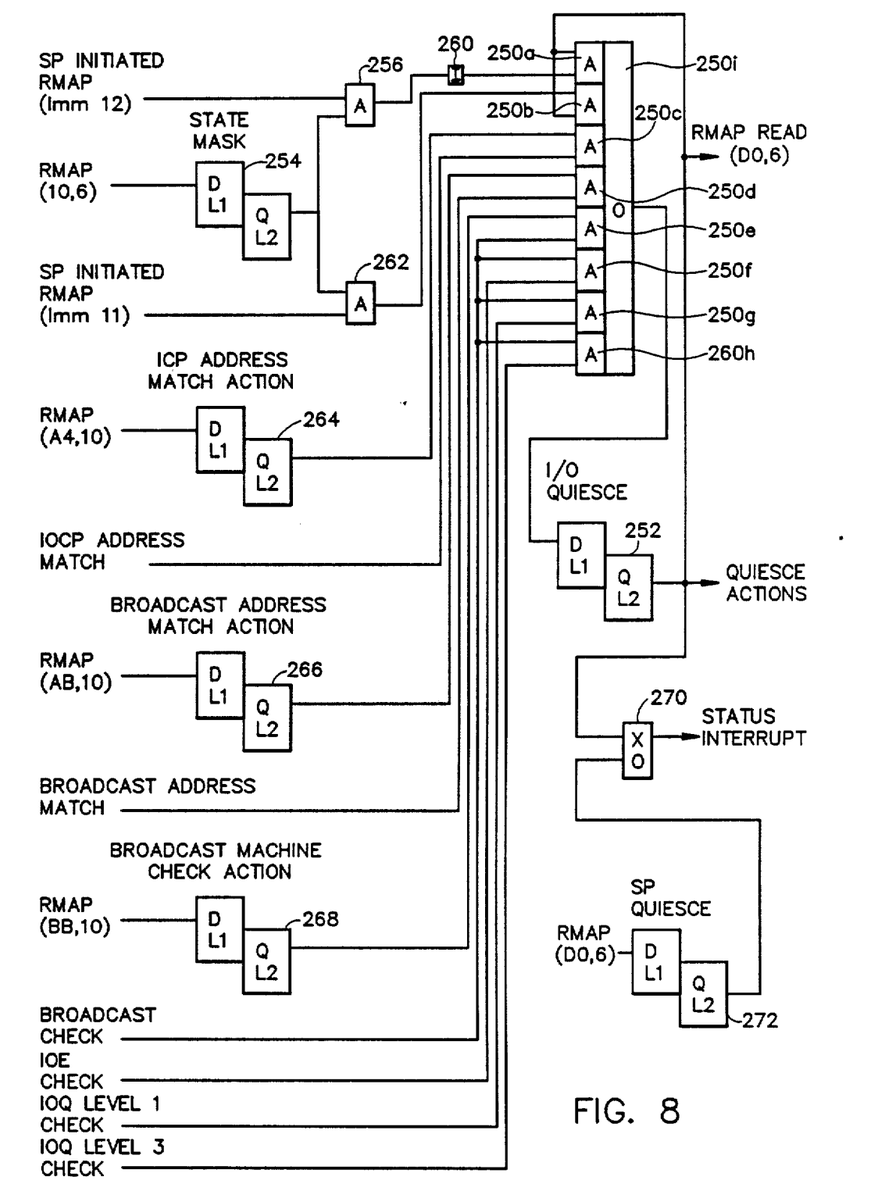
FIG. 8 illustrates, in schematical form, a specific circuit implementation of the quiesce logic.

For purposes of simplicity in illustration, the SRL's in FIG. 8 is illustrated without the clock input signals. It should be understood that each of these SRL's are identical to those illustrated in FIG. 4.

It should be further understood that when a signal is active it is in a logical "1" state. Correspondingly, when a signal is inactive, it is in a logical "0" state. With further reference to the SRL's, when a SRL is set, the SRL with the data stored in the SRL is provided at the Q output is an active signal in a logical "1" state. Correspondingly, when the SRL is reset, the data stored in the SRL and provided at the Q output is an inactive signal in a logical "0" state.

It should be noted that IOQ control logic 172 is identical to CREG control logic 154 and therefore is not further described. The CREG control logic 154 is utilized to control the microword which is loaded into CREG 144 via multiplexer 136. CREG control logic 154 provides an output signal in response to the signals START IOE, GATEL2, and HALT as one of three control signals, i.e., WRAP CREG, FORCE CREG or LOAD CREG which one and only one will be active. If the LOAD CREG signal is active, then the microword from control store 26 is loaded into the CREG 144. If the WRAP CREG signal is active, then the present state, i.e., the current microword stored in CREG 144, is loaded back into CREG 144. If the FORCE CREG signal is active, then the hard-wired no operation (NOP) microword is loaded into CREG 144.

Microword control logic 148 sends 2 signals, GATEL2 and HALT, to CREG control logic 154. These particular signals are used to control the sequencing of microwords in control store fetches of microwords. The START IOE signal is the inverse of the QUIESCE signal and is also provided to CREG control logic 154. When the START IOE signal is active, CREG control logic 154 enables IOE element 28 to continue normal operation. When the START IOE signal is inactive, CREG control logic 154 causes IOE element 28 to stop microword fetch from control store 26 and execution of the microword. The GATEL2 signal keeps IOE element 28 and IOQ element 30 in synchronization. When the GATEL2 signal is active, CREG 144 contains a valid operational code microword fetched from control store 26 to be executed. The GATEL2 signal is inactive when IOE element 28 is using CSAR 130 to perform a microword fetch of the next operational code from control store 26. The HALT signal causes the GATEL2 signal to freeze in the active state when a multiple cycle operational code microword is encountered.

The SET ACTIVE signal is the set condition for an IOE ACTL2 latch or SRL. The RESET ACTIVE signal is the reset condition for the IOE ACTL2 latch or SRL when the IOE ACTL2 latch is set the IOE element is active. When the IOE ACTL2 latch is reset, the IOE and the IOQ elements are in the quiesce state and remain in sync for a restart in operation. When the IOE ACTL2 latch is set the IOE and IOQ elements are in the normal microword fetch and execute mode. The IOE ACTL2 signal is also used elsewhere in the IOE to freeze crucial portions of the data flow, control logic and address generation so the current microcode stream may be started from the exact state from which it was in prior to the quiesce state. In this manner, the quiesce function is transparent to the microcode and acts in a similar fashion to a hardware generated interrupt.

IOQ element 30 issues a QUIESCE signal to the IOE in the form of the START IOE signal. When the START IOE signal is inactive, the quiesce function is active. When the START IOE signal is inactive, the IOE and IOQ will finish all current operations that have been started and sequence to a known state where system clocks can be easily stopped and restarted. Any data moves that were executing when the quiesce request was received will complete, except for data moves to and from main storage. Storage requests will complete only to the point the IOE and IOQ elements suspend for a status return from storage. The status return will be checked after the IOE and IOQ elements resume operation following the quiesce state. Once in the quiesce state, the IOE and IOQ elements will force no operation (NOP) microwords into respectively CREG's 144 and 168 respectively from NOP elements 140 and 162.

In FIG. 4, the START IOE signal is provided to the D input of SRL 210. The GATEL2 signal is provided as an input to inverter 212. Similarly, the HALT signal is provided as an input to inverter 214. The Q output of SRL 210 is the START IOEL2 signal which is provided as one input to AND gate 216 and as an input to inverter 218. The output of inverter 212 is the inverted GATEL2 signal which is provided to the other input of AND gate 216. The inverted GATEL2 signal is also provided as one input to AND gate 220. The output of AND gate 216 is the signal SET ACTIVE which is provided as one input to OR gate 222. The output of inverter 218 is provided to an input of AND gate 220. The inverted HALT signal output from inverter 214 is provided as another input of AND gate 220. The output of AND gate 220 (the RESET ACTIVE signal) is provided through inverter 224 to an input of AND gate 226. The output of AND gate 226 is coupled as the other input of OR gate 222.

The output of OR gate 222 is coupled to the D input of IOE ACTL2 latch or SRL 228 and to the input of inverter 230. The output from SRL 228, provided at the Q output, is the IOE ACTL2 signal. This signal is provided as the other input to AND gate 226 and to the input of AND gate 232. The output of inverter 230 is the signal IOE ACTIN signal which is provided as an input to OR gate 234. AND gate 232 in addition to receiving the IOE ACTL2 signal has coupled at one input the GATEL2 signal and the inverted HALT signal as provided by the output from inverter 214. The IOE ACTIN signal is provided as an input to OR gate 234 along with the HALT signal.

The output of OR gate 234 is the WRAP CREG signal while the output from AND gate 232 is the FORCE CREG signal. The WRAP CREG and FORCE CREG signals are respectively input to inverters 236 and 238 where the outputs thereof are input to AND gate 240. The output of AND gate 240 is the signal LOAD CREG.

Figure 5:
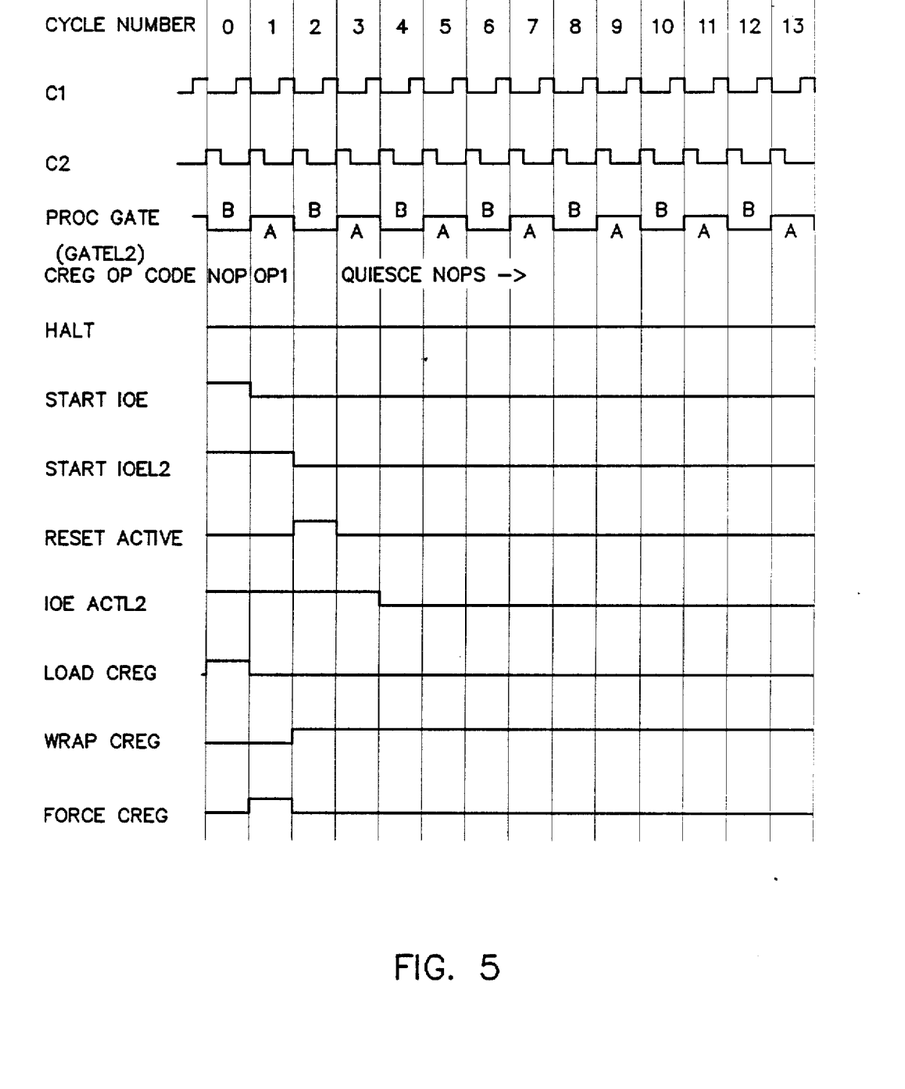
FIGS. 5-7 illustrate exemplary timing diagrams of various system operation signals of the present invention.
Figure 6:
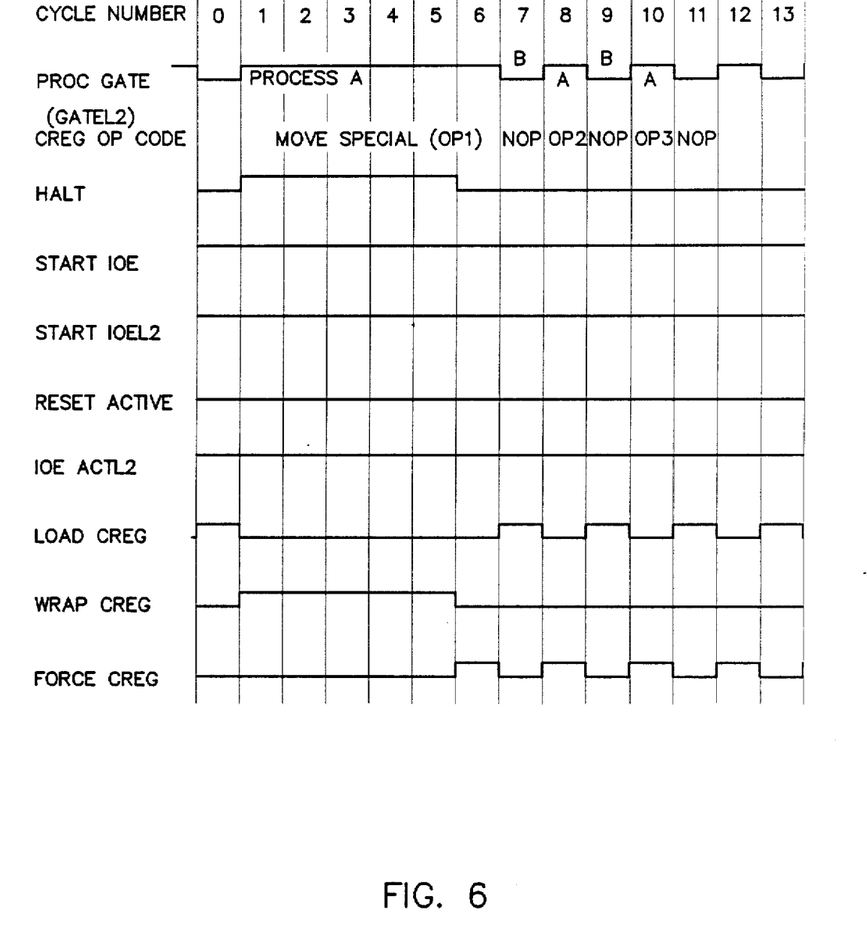
Figure 7:
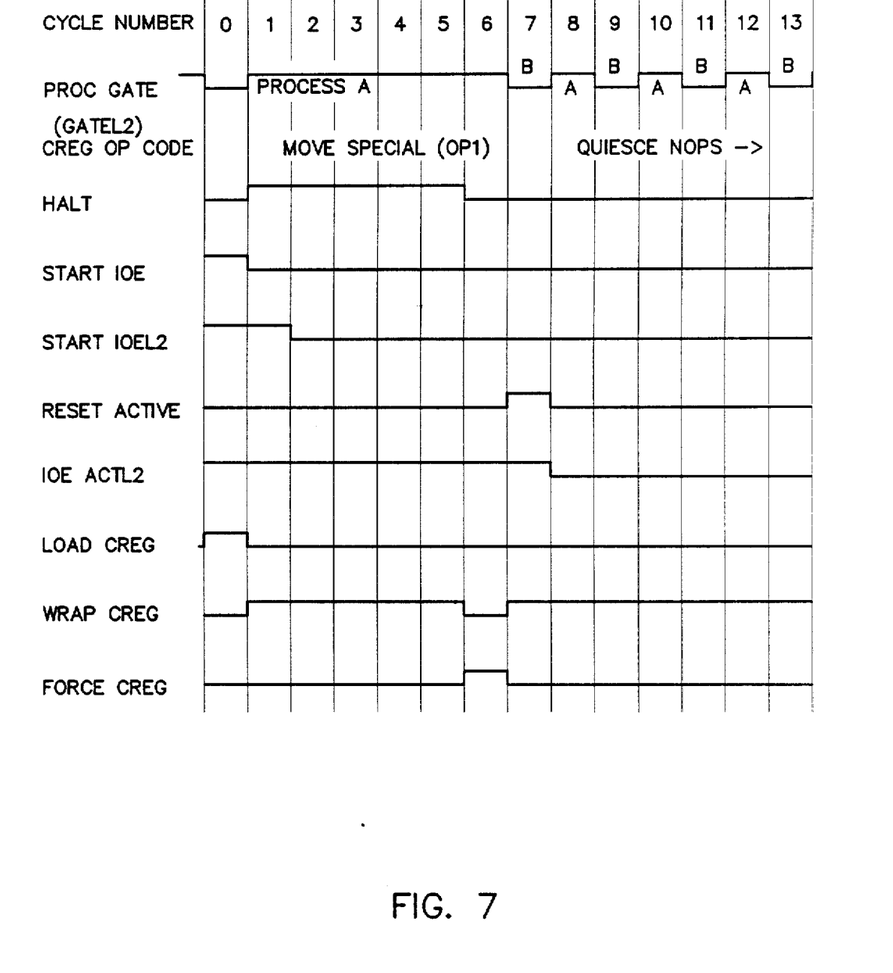

FIGS. 5–7 illustrate exemplary timing diagrams which demonstrate a quiesce request, which is initiated by the START IOE signal going inactive and which is accepted during normal execution of both single and multi-cycle (halting) microwords. It should be understood that although the following description is with reference to the IOE element, the IOQ element has circuitry and signals corresponding to those of the IOE element.

FIG. 5 illustrates the operation of the CREG control logic and the CREG microword loading when a quiesce condition takes place at the beginning of a single clock cycle microword. This example illustrates the shortest number of cycles that may occur between the actual quiescence event and the IO control processor becoming completely quiesced prior to clock stopping. In the single cycle operational code microword, the HALT signal is inactive, i.e., a logical "0" state. During cycle number 0, the signal START IOE is active, i.e., a logical "1", indicating normal operation of the CREG control logic. Also during cycle number 0, a no operation (NOP) code microword is present in the control register. However the LOAD CREG signal is active, so as to load the CREG 144 with an operational code for execution during the following cycle, i.e., cycle number 1.

At the initiation of cycle number 1, the operational code microword (OP1) is loaded into CREG 144 for execution. Also at the beginning of cycle number 1, the signal START IOE goes inactive which is indicative of a quiesce condition. With the START IOE signal going inactive, the LOAD CREG and the FORCE CREG signals both change state. During cycle number 1, the LOAD CREG is inactive while the FORCE CREG signal is active. With the FORCE CREG signal being active during cycle number 1, the hard-wired no operation (NOP) microword is loaded into the CREG.

At the beginning of cycle number 2, the START IOEL2 signal goes inactive, with the RESET ACTIVE going active. Furthermore, the WRAP CREG signal goes active while the FORCE CREG signal goes inactive. With the WRAP CREG signal going active at the beginning of cycle number 2, the hard-wired NOP microword is reloaded from CREG 144 via miltiplexer 136 into CREG 144 for the next cycle operation, i.e., cycle number 3 and until the end of the quiesce condition.

At the beginning of cycle number 4, the IOE ACTL2 signal which was previously active goes inactive to indicate that the IOE is quiesced and that the IOE and IOQ elements remain in synchronization for a restart.

FIG. 6 is a timing diagram illustrating the normal execution of a "MOVE SPECIAL" microword which will execute a 2, 3 or 4 byte data move between the IOE and IOQ elements. This particular microword requires six clock cycles to execute. During cycle number 0, the LOAD CREG signal goes active to enable fetching of the microword from control store 26 which is loaded via multiplexer 136 into CREG 144. Microword control logic 148 is responsive to the "MOVE SPECIAL" microword by setting the GATEL2 signal active during cycle numbers 1–6. Furthermore, the HALT signal changes from inactive to active during cycle number 1. Correspondingly, in response to the HALT signal changing state, the WRAP CREG signal changes from inactive to active, while the LOAD CREG signal changes from active to inactive. With the HALT signal active during cycles 1-5, the WRAP CREG signal also remains active during these cycles. At the beginning of cycle number 6 when HALT and the WRAP CREG signals change to inactive while the FORCE CREG signal goes active. Accordingly, during cycle number 6, CREG 144 is loaded with the hard-wired no operation (NOP) code. At the beginning of cycle number 7, the LOAD CREG signal goes active, so that a control store operational code microword is loaded into CREG 144 and executed during cycle number 8. During cycles number 9 and 10, the no operation (NOP) code microword and further operation code microwords are alternately loaded into CREG 144 for execution.

FIG. 7 illustrates the same "MOVE SPECIAL" microword instruction being executed as in the timing diagram of FIG. 6 with a quiesce request being presented to the IOE at the beginning of microword execution. In FIG. 7, at cycle number 0, the GATEL2 signal and the HALT signals are both inactive with the START IOE signal active. Accordingly, the LOAD CREG signal is set active, thereby loading CREG 144 with the "MOVE SPECIAL" microword received via control store 26 and multiplexer 136.

At the beginning of cycle number 1, the GATEL2 and the HALT signals go active indicative of a process operation and a multiple cycle execution. Furthermore, at the beginning of cycle number 1, the START IOE signal changes to inactive indicative of a quiesce condition. With the GATEL2 and HALT signals being active at the beginning of cycle number 1, the LOAD CREG signal changes to an inactive state while the WRAP CREG signal changes from inactive to active. With the START IOE signal inactive at the beginning of cycle 1, the latched START IOE signal, i.e., the START IOEL2 signal changes from active to inactive state at the beginning of cycle number 2.

During cycle numbers 1-5, the HALT signal remains active along with the WRAP CREG signal. However, the GATEL2 remains active through cycle numbers 1-6. At the beginning of cycle number 6, the HALT signal goes inactive while the START IOE signal remains inactive. Accordingly, the WRAP CREG signal changes from an active to inactive state while the FORCE CREG signal changes from inactive to active.

At the beginning of the cycle number 7 when the GATEL2 signal goes inactive, and with the HALT and START IOEL2 signals going active, the RESET ACTIVE signal becomes active. Furthermore, the WRAP CREG signal goes active while the FORCE CREG signal goes inactive so that the hard-wired NOP microword which was loaded into CREG 144 is cycled repeatedly during the quiesce condition. At the beginning of cycle number 8, the RESET ACTIVE and IOE ACTL2 signals go inactive.

FIG. 8 illustrates quiesce logic 176 of FIG. 2 in the schematical form. Quiesce logic 176 is responsive to seven conditions which may cause the quiesce function to be activated. These conditions are a service processor (SP) initiated quiesce action; an IOCP address match, broadcast address match, a broadcast machine check, an IOE element level 1 machine check, an IOQ element level 1 machine check, and and IOQ element level 3 machine check.

Quiesce logic 176 is comprised primarily of an AND-OR logic gate book 250 having a series of inputs to AND gates 250a-250h having an internal output connected to an internal input of OR gate 250i. The output of OR gate 250i is coupled to the D input of I/O quiesce latch or SRL 252. The Q output of SRL 252 provides the quiesce signal.

The SP is capable of setting and resetting the quiesce condition in SRL 252. The SP initiated quiesce logic includes a state mask latch or SRL 254 having a D input for receiving data via the Rapid Maintenance Access Path (RMAP) from RMAP address 10, data bit 6. The Q output of SRL 254 is coupled to an input of AND gate 256. The other input of AND gate 256 is coupled to receive the SP initiated command signal (Imm 12) via the RMAP with the command signal being an immediate set pulse for RMAP address 12. The output of AND gate 256 is coupled to an input of inverter 260 which has an output coupled to an input of AND gate 250a. The other input of AND gate 250a is coupled to the Q output of SRL 252. The output of SRL 254 is also coupled to an input of AND gate 262. The other input of AND gate 262 is coupled to receive the SP initiated command (Imm 11) via RMAP which is an immediate set pulse for RMAP address 11. The output of AND gate 262 is provided to both inputs of AND gate 250b.

When SRL 254 is set by a logical "1" from the RMAP address 10, data bit 6, and the RMAP Imm 11 is a logical "1" the quiesce latch 252 is set with the output being a logical "1". Similarly, when SRL 254 is set active and the RMAP command Imm 12 changes to a logical "1", quiesce latch 252 is reset to provide an output at a logical "0" state. The feedback from the output of SRL 252 to the one input of AND gate 250a enables SRL 252 latch to hold its present state until reset by the SP RMAP Imm 12 command. When SRL 254 is reset, no matter what the RMAP immediate command is, the hardware implementation prohibits the setting and resetting of the SRL 252.

When IOCP address match action latch or SRL 264 is set via the RMAP address A4, bit 10, SRL 252 is enabled to receive the IOCP address match condition. The Q output of SRL 264 is connected to an input of AND gate 250c. The other input of AND gate 250c receives an IOCP address match signal. When the IOCP address match signal is a logical "1," it is indicative of an error condition or a debug checkpoint is reached in the IOCP microcode. When both the output of SRL 264 and the IOCP address match signal are a logical "1", SRL 252 is set providing a logical "1" output indicative of the quiesce condition.

When Broadcast address match latch or SRL 266 is set via the RMAP address AB, bit 10, SRL 252 is enabled to receive the broadcast address match condition. The output of SRL 266 is connected to an input of AND gate 250d. The other input of AND gate 250d receives Broadcast address match signal. When the Broadcast address match signal is a logical "1", it is indicative of an error condition or a debug checkpoint is reached in hardware external to the IOCP card. When both the output of SRL 266 and the Broadcast address match signals are a logical "1", SRL 252 is set providing a logical "1" output indicative of the quiesce condition.

When Broadcast machine check action latch or SRL 268 is set active, SRL 252 is also enabled to receive the broadcast machine check condition. SRL 268 is set or reset via the RMAP state of data bit 10 at RMAP address BB. The Q output of SRL 268 is coupled to respective inputs of AND gates 250e, 250f, 250g and 250h. SRL 268 is used to mask or disable a broadcast machine check, an IOE check, an IOQ level 1, and an IOQ level 3 machine check conditions from causing a quiesce condition. When SRL 268 is set active, and one of broadcast check, IOE check, IOQ level 1 check or IOQ level 3 check signals, respectively provided as the other inputs of AND gates 250e-250h, is a logical "1", SRL 252 is set active. It should be noted that latches 254, 264, 266 and 268 all provide programmability in enabling or disabling quiesce latch in response to SP initiated requests, address match, and error or debug conditions.

Quiesce logic 176 also provides a status interrupt signal to the support processor indicating the status of the quiesce function. The output of SRL 252 is provided as one input to Exclusive OR gate 270, while the other input is coupled to the output of a SP quiesce latch or SRL 272. The output of SRL 252 is provided to the SP where the data is read from address DO, bit 6. When SRL 252 changes states, a status interrupt is sent to the SP via Exclusive OR gate 270. This interrupt is generated by comparing the output of SRL 252 with the support processor's perception of the actual state, as indicated by the previously read SP data stored in the RMAP address DO, bit 6, which is also stored in SRL 272. A miscompare between the logic levels of the outputs of SRL 252 and SRL 272 will activate the states interrupt. Reading by the support processor of the RMAP address DO, data bit 6, obtains the actual state of the output of the quiesce latch 252. This value is then written to the SP quiesce latch, SRL 272, via RMAP address DO, bit 6 by a support processor RMAP write command. With this new value also stored in SRL 272, the status interrupt is cleared.

We claim:

1. In a processing system including independently-clocked central processing and I/O control processing units, a memory, and an address/data/control (ADC) bus for coupling at least one I/O device to said I/O control processing unit, said I/O control processing unit for processing system I/O instructions to enable information transfer on said ADC bus, said I/O control processing unit having an instruction processor, a control store, an I/O clock source, control logic, a control register, an ADC bus arbiter; said control logic for selecting instructions from said control store for transfer to said control register with said control logic for controlling the transfer of instructions to said control store, said instruction processor for executing instructions in said control register for controlling the transfer of information between said central processing unit and said I/O control processing unit, between said memory and said I/O control processing unit, and on said ADC bus with said ADC bus arbiter arbitrating ADC bus requests and providing ADC bus access to each request bus user according to a predetermined hierarchy, said I/O control processing unit having an apparatus for, in response to an error indication, suspending I/O control processing unit operation in a known state, and suspending ADC bus arbiter operation so as to inhibit ADC bus access to requesting users, said apparatus comprising:

quiesce means responsive to an error indication for generating a quiesce signal indicative of a quiesce condition;

no operation (NOP) means connected to said quiesce means and said control register, said NOP means for generating a no operation (NOP) instruction and responsive to said quiesce signal for loading said NOP instruction into said control register; and wherein said instruction processor repeatedly executes said NOP instruction during said quiesce condition.

2. The apparatus of claim 1 wherein said NOP means is further responsive to said quiesce signal for loading said NOP instruction into said control register upon completion of execution of a current instruction in said control register.

3. The apparatus of claim 1 wherein said quiesce means is connected to said ADC bus arbiter for providing said ADC bus arbiter with said quiesce signal so as to suspend ADC bus arbiter operation.

4. In a computing system including a processor for executing instructions, a control register in said processor for receiving instructions to be executed by said processor, a bi-direction bus connected to said processor, and an arbiter in said processor for allocating use of said bi-directional bus in response to bus use requests, an improvement for suspending the operation of said processor in response to error and quiesce conditions which are indicated by a quiesce conditioning signal, said improvement comprising, in combination:

instruction control logic connected to said control register for producing an instruction loading signal in response to a first instruction in said control register;

a quiesce means for activating a quiesce signal in response to said quiesce conditioning signal;

control register circuit means connected to said control register, said instruction control logic, and said quiesce means for loading a NOP instruction into said control register in response to said instruction loading signal and to said activation of said quiesce signal; and means in said bus arbiter and connected to said quiesce means for suspending allocation of use of said bi-directional bus in response to said quiesce signal.

5. In a computing system including a first and second processor and a bi-directional bus connected to said second processor, said first processor including a first control register for receiving an instruction to be executed by said first and second processors and instruction control logic connected to said first control register for producing an instruction load signal in response to said instruction, and said second processor including a second control register for receiving said instruction and an arbiter for allocating access to said bi-directional bus, an improvement for suspending operations of said first and second processors in response to a condition signal indicating the presence of conditions requiring suspension of the operation of said first and second processors, wherein the improvement comprises:

a quiesce means in said second processor for activating a quiesce signal in response to said condition signal;

in said first processor:

a first control circuit connected to said quiesce means and to said instruction control logic for producing a sequence of load signals in response to said instruction load signal and to said quiesce signal; and a NO OP circuit connected to said first control circuit and to said first control register and responsive to said sequence of load signals for entering a NOP instruction into said first control register and retaining said NOP instruction in said first control register;

and, in said second processor;

a second control circuit connected to said quiesce means and to said instruction control logic for producing a sequence of load signals in response to said instruction load signal and to said quiesce signal;

a NO OP circuit connected to said second control circuit and to said second control register and responsive to said sequence of load signals for entering a NOP instruction into said second control register and retaining said NOP instruction in said second control register; and means in said arbiter and connected to said quiesce means for suspending access allocation of said bi-directional bus.

* * * * *